P. MUNZINGER.
PHOTOMETER.
No. 170,292. Patented Nov. 23, 1875.
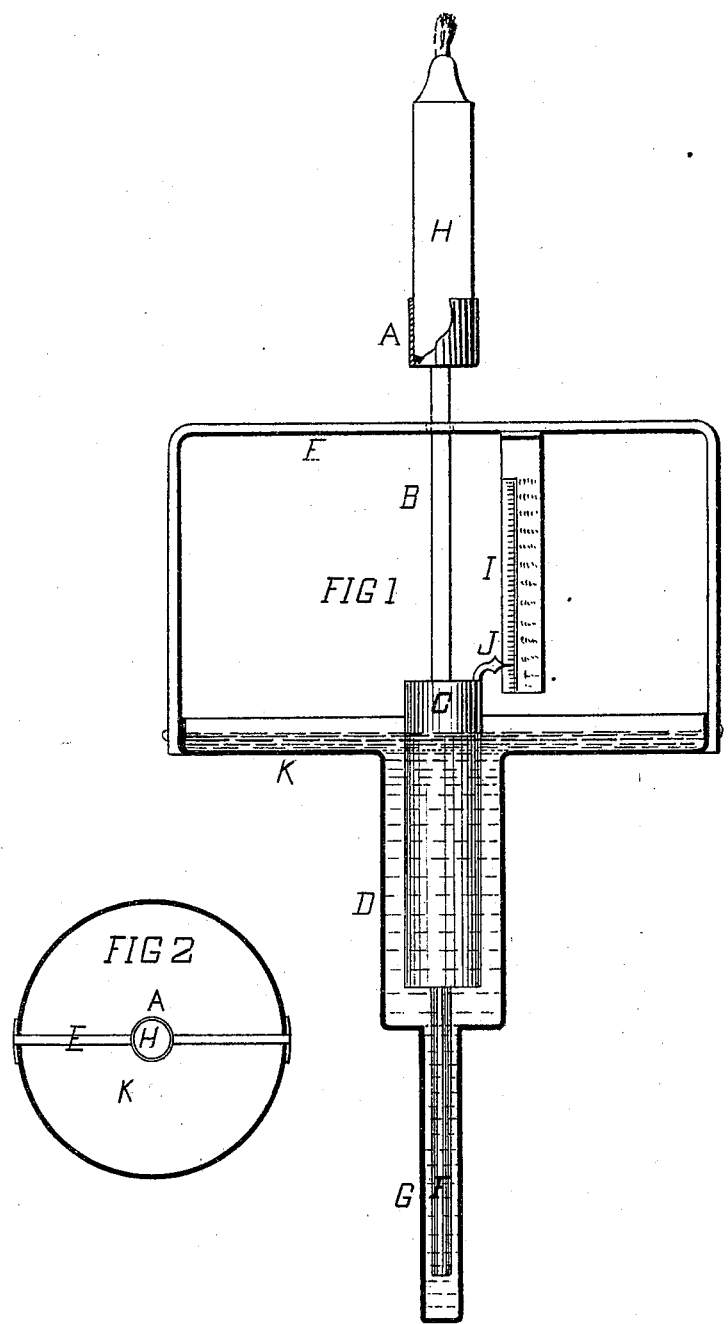

UNITED STATES PATENT OFFICE.

PETER MUNZINGER, OF PHILADELPHIA, PENNSYLVANIA, ASSIGNOR TO MORRIS, TASKER & CO., OF SAME PLACE.

IMPROVEMENT IN PHOTOMETERS.

Specification forming part of Letters Patent No. 170,292, dated November 23, 1875; application filed July 6, 1875.

*To all whom it may concern:*

Be it known that I, PETER MUNZINGER, of Philadelphia, Pennsylvania, have invented a new and useful Photometrical Apparatus, of which the following is a specification:

The invention is so fully and accurately described hereinafter that a preliminary description is not deemed necessary.

Figure 1 is a vertical diametrical section. Fig. 2 is a reduced plan view of Fig. 1.

The apparatus is for photometrical or light-measuring purposes. It consists of a candle-socket A on the end of an axial rod, B, of a float, C, contained in a water-chamber, D. The vertical motion of the float is retained at the top by the socket-rod passing through a guide-frame, E, and at the bottom by an axial guide-rod, F, of the float, and a guide-tube, G, which forms a reduced extension of the chamber D. A candle, H, is placed in the socket A, and water is poured in the chamber D until the float C rises to the zero-point of the stationary scale I, (graduated in grains,) as shown by the index J fixed to the float. On the candle being lighted its burning and consuming increases the specific lightness of the float, which gradually and imperceptibly rises in the water, and keeps the burning-point of the candle, without variation, at the same altitude. The index J, rising with the float, shows on the scale the candle consumed in grains. To preclude any possibility of the chamber D not having sufficient water capacity to float the index J to the zero-point of the scale, a dish or an enlargement, K, of the chamber D can be used to hold the additional supply of water.

I claim as my invention—

1. In a photometrical apparatus the combination of a float-chamber, D, a guide-tube, G, and a dish, K, as shown and described.

2. The combination of a rod, B, float C, frame E, rod F, and guide-tube G, as shown and described.

3. The combination of a socket, A, rod B, float C, chamber D, scale I, and index J, as shown and described.

In testimony whereof I hereunto sign my name in presence of two subscribing witnesses.

PETER MUNZINGER.

Witnesses:
T. C. WARWICK,
FRANCIS D. PASTORIUS.